(12) United States Patent
Geva et al.

(10) Patent No.: US 10,831,958 B2
(45) Date of Patent: Nov. 10, 2020

(54) INTEGRATED CIRCUIT DESIGN WITH OPTIMIZED TIMING CONSTRAINT CONFIGURATION

(71) Applicant: INTERNATIONAL BUSINESS MACHINES CORPORATION, Armonk, NY (US)

(72) Inventors: Ofer Geva, Ramat Hasaron (IL); Shiran Raz, Ganey Tikva (IL); Yaniv Maroz, Kiryat Uno (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/143,842

(22) Filed: Sep. 27, 2018

(65) Prior Publication Data

US 2020/0104452 A1 Apr. 2, 2020

(51) Int. Cl.
| | | |
|---|---|---|
| *G06F 30/3312* | (2020.01) | |
| *G06F 30/398* | (2020.01) | |
| *G06F 30/30* | (2020.01) | |
| *G06F 30/33* | (2020.01) | |
| *G06F 119/12* | (2020.01) | |

(52) U.S. Cl.
CPC .......... *G06F 30/3312* (2020.01); *G06F 30/30* (2020.01); *G06F 30/33* (2020.01); *G06F 30/398* (2020.01); *G06F 2119/12* (2020.01)

(58) Field of Classification Search
CPC ............... G06F 17/505; G06F 17/5081; G06F 17/5031; G06F 2217/14; G06F 17/5045; G06F 2217/84; G06F 17/5022; G06F 17/5068; G06F 30/398; G06F 30/30; G06F 30/3312; G06F 2119/12; G06F 30/33
See application file for complete search history.

(56) References Cited

U.S. PATENT DOCUMENTS

| | | | | |
|---|---|---|---|---|
| 5,461,576 A | * | 10/1995 | Tsay ...................... | G06F 17/505 716/113 |
| 5,751,596 A | * | 5/1998 | Ginetti ................ | G06F 17/5031 716/104 |
| 5,883,808 A | * | 3/1999 | Kawarabayashi .... | G06F 17/505 716/108 |
| 6,263,478 B1 | * | 7/2001 | Hahn .................. | G06F 17/5031 716/113 |

(Continued)

*Primary Examiner* — Helen Rossoshek
(74) *Attorney, Agent, or Firm* — Cantor Colburn LLP; William Kinnaman

(57) ABSTRACT

Generating a design of an integrated circuit by analyzing a physical design of an integrated circuit by determining, for a pin of a circuit of the integrated circuit, that a candidate timing constraint for signal arrival time at the pin is later than a current timing constraint for signal arrival time at the pin, determining that a slack value associated with the current timing constraint has a greater negative value than a predefined negative slack threshold value, determining that the current timing constraint is within a user-defined range of signal arrival time values associated with the pin, determining that the candidate timing constraint is earlier than a latest-allowable signal arrival time at the pin, setting the current timing constraint equal to the candidate timing constraint, and generating a revised physical design of the integrated circuit that incorporates the current timing constraint.

20 Claims, 4 Drawing Sheets

(56) References Cited

U.S. PATENT DOCUMENTS

| | | | |
|---|---|---|---|
| 7,698,674 B2* | 4/2010 | Kalafala | G06F 17/5031 |
| | | | 703/15 |
| 8,413,099 B2* | 4/2013 | Mottaez | G06F 17/5045 |
| | | | 716/106 |
| 8,572,539 B2* | 10/2013 | Cortadella | H03K 19/20 |
| | | | 327/142 |
| 9,032,347 B1 | 5/2015 | O'Riordan | |
| 9,471,735 B2* | 10/2016 | Chakrabarti | G06F 17/5081 |
| 9,659,139 B2* | 5/2017 | Brown | G06F 17/5081 |
| 2014/0089880 A1 | 3/2014 | Haller et al. | |
| 2015/0199465 A1 | 7/2015 | Alpert et al. | |
| 2018/0173818 A1* | 6/2018 | Amaru | G06F 17/505 |

\* cited by examiner

INTEGRATED CIRCUIT DESIGN WITH OPTIMIZED TIMING CONSTRAINT CONFIGURATION

BACKGROUND

Modern integrated circuits are typically designed using a hierarchical design methodology, where the overall design of integrated circuits is recursively partitioned into multiple levels of components, where a parent component at one level of the hierarchy may have several child components at the next lower level of the hierarchy. This allows for various types of design and testing to be performed at the component level.

One such type of design and testing relates to timing closure, which refers to the process of designing and optimizing a circuit such that an electrical signal traversing the circuit meets specified timing requirements. Timing closure of a component is typically dependent on timing constraints imposed at its boundary (primary input and primary output) pins by its parent component. After the locations of the various components and their pins are set during physical synthesis of the IC, techniques such as static timing analysis (STA) are typically applied to each component to determine whether the timing constraints imposed on the component by its parent component are met, as well as the extent to which they are not.

The designs of the various integrated circuit components typically change many times throughout an integrated circuit design life cycle, as do the timing constraints imposed on the components, and thus physical synthesis and timing closure are typically performed over and over again in an iterative process. Unfortunately, timing constraint values are often unwittingly set by designers, which may cause longer timing closure iterations or unoptimized timing data, or are set to fixed values early in the integrated circuit design life cycle, resulting in unnecessary design constraints.

SUMMARY

The invention, in embodiments thereof, relates to a new approach to integrated circuit design by optimizing timing constraint configuration and thereby improve the process of integrated circuit design and, as a result, the performance of manufactured integrated circuits.

In one aspect of the invention a method is provided for generating a design of an integrated circuit, the method including analyzing a physical design of an integrated circuit by determining, for a pin of a circuit of the integrated circuit, that a candidate timing constraint for signal arrival time at the pin is later than a current timing constraint for signal arrival time at the pin, determining that a slack value associated with the current timing constraint has a greater negative value than a predefined negative slack threshold value, determining that the current timing constraint is within a user-defined range of signal arrival time values associated with the pin, and determining that the candidate timing constraint is earlier than a latest-allowable signal arrival time at the pin, setting the current timing constraint equal to the candidate timing constraint, and generating a revised physical design of the integrated circuit that incorporates the current timing constraint.

In other aspects of the invention, systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
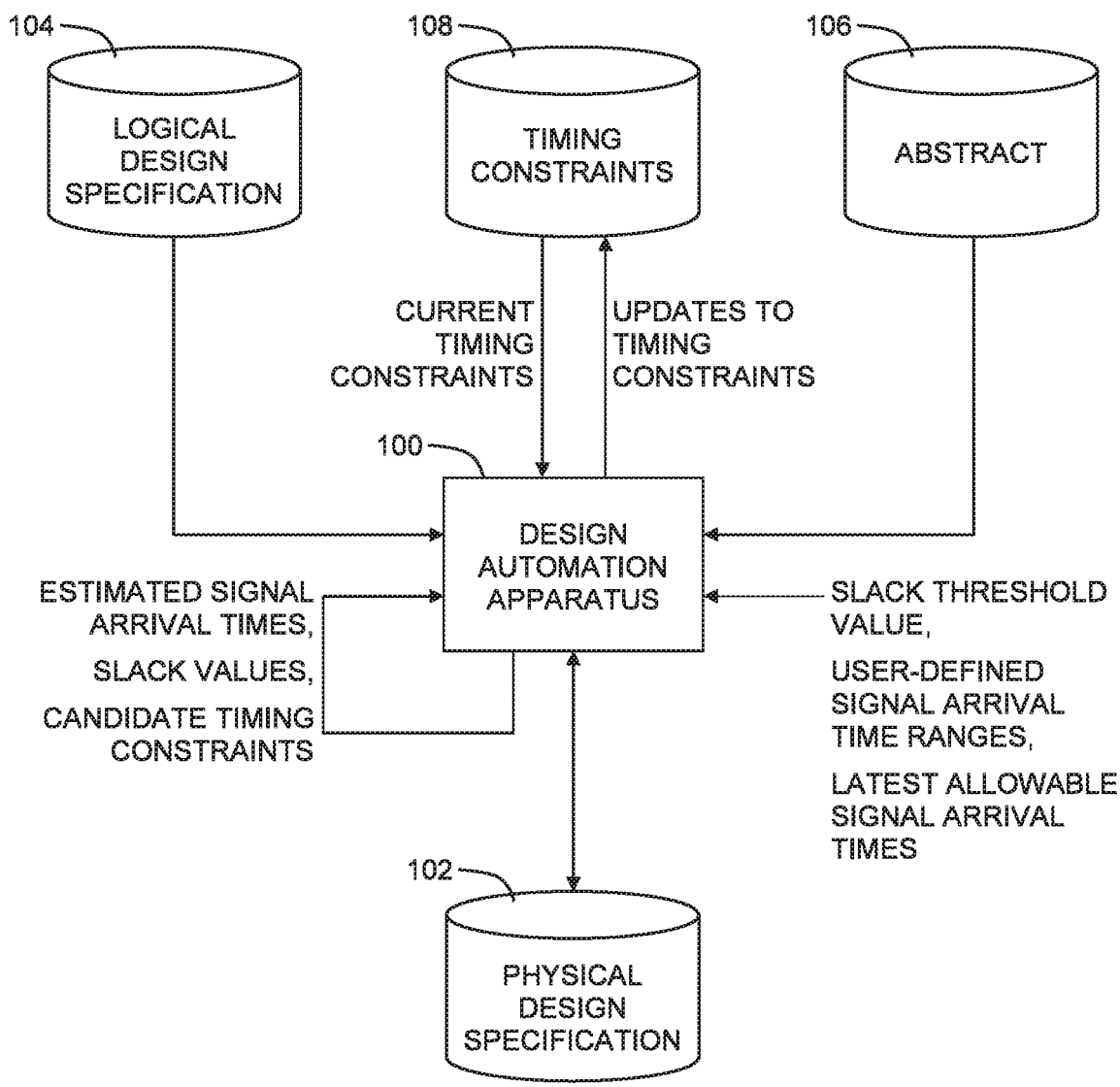
FIG. 1 is a simplified conceptual illustration of a system for integrated circuit design with optimized timing constraint configuration, constructed and operative in accordance with an embodiment of the invention.

Reference is now made to FIG. 1, which is a simplified conceptual illustration of a system for integrated circuit design with optimized timing constraint configuration, constructed and operative in accordance with an embodiment of the invention. In the system of FIG. 1, design automation apparatus 100 is configured to generate a hierarchical physical design specification 102 of the various components (macros, memory, etc.) of an integrated circuit in accordance with conventional physical synthesis techniques, such as by processing the following inputs:

- a logical design specification 104 of an integrated circuit, where logical design specification 104 is typically written in a hardware description language such as VHDL or Verilog;
- an abstract 106 specifying the target physical dimensions and pin locations of the integrated circuit; and
- timing constraints 108 imposed at the boundary (primary input and primary output) pins of each component of the integrated circuit.

Timing constraints 108 are typically set at the macro level by the component to which the macro belongs, i.e., that is above the macro in hierarchical physical design specification 102.

Timing constraints 108 may be initially provided in accordance with conventional techniques, and typically constrain both clock signal arrival time rise (ATR) and arrival time fall (ATF) for each boundary pin of each component of the integrated circuit. Timing constraints 108 typically include other information, such as slew rate and capacitance, and are expressed in units of time, such as picoseconds, indicating the elapsed time after the start of a clock cycle at which the clock signal is to arrive at a pin in order to meet a given constraint.

Design automation apparatus 100 is further configured to analyze physical design specification 102 using conventional techniques, such as static timing analysis (STA), to determine an estimated ATR and ATF for each boundary pin of each component of the integrated circuit, as well as a slack value indicating the amount of time that the estimated ATR and ATF would be expected to arrive at the pin earlier or later than the time specified by the corresponding ATR and ATF constraint for the pin in timing constraints 108. Thus, for example, if the ATR and ATF constraints for a given pin in timing constraints 108 are 120 ps and 150 ps respectively, and the estimated ATR and ATF at the pin are 130 ps and 140 ps respectively, their respective slack values are 10 ps and +10 ps respectively.

Design automation apparatus 100 is further configured to analyze physical design specification 102 and provide an optimized configuration of timing constraints 108 in the manner now described. Given a current timing constraint in timing constraints 108, such as an ATR, for a given pin of a given component, such as a macro, of physical design specification 102, as well as a candidate timing constraint of the same type (i.e., ATR) for the same pin, design automation apparatus 100 performs any, and maybe all, of the following, and in one embodiment in the following order:
1) determines whether the candidate timing constraint is later than the current timing constraint;
2) determines whether the slack value associated with the current timing constraint has a greater negative value than a predefined negative slack threshold value;
3) determines whether the current timing constraint is within a user-defined range (if specified) of signal arrival time values associated with the pin; and
4) determines whether the candidate timing constraint is earlier than a latest-allowable signal arrival time at the pin.

In accordance with an embodiment of the invention, design automation apparatus 100 sets the given current timing constraint in timing constraints 108 equal to the candidate timing constraint if all of the following are true:
the candidate timing constraint is later than the current timing constraint;
the slack value associated with the current timing constraint has a greater negative value than a predefined negative slack threshold value;
the current timing constraint is within a user-defined range (if specified) of signal arrival time values associated with the pin; and
the candidate timing constraint is earlier than a latest-allowable signal arrival time at the pin.

If design automation apparatus 100 determines that the candidate timing constraint is not later than the current timing constraint or that the slack value associated with the current timing constraint does not have a greater negative value than a predefined negative slack threshold value, then the given current timing constraint in timing constraints 108 is left unchanged. If design automation apparatus 100 determines that the current timing constraint is not within a user-defined range of signal arrival time values associated with the pin, then the given current timing constraint in timing constraints 108 is set equal to the user-defined range boundary value that is closest to the given current timing constraint. If design automation apparatus 100 determines that the candidate timing constraint is within the user-defined range of signal arrival time values associated with the pin, then the given current timing constraint in timing constraints 108 equal to the candidate timing constraint. If design automation apparatus 100 determines that, the candidate timing constraint is later than a latest-allowable signal arrival time at the pin, then the given current timing constraint in timing constraints 108 is left unchanged. If design automation apparatus 100 determines that the current timing constraint is later than the latest-allowable signal arrival time at the pin, then the given current timing constraint in timing constraints 108 is set equal to the latest-allowable signal arrival time at the pin.

The predefined slack threshold value specifies a tolerance against which an estimated signal arrival time at a pin is measured and is set based on the degree of design stability at any given point during the integrated circuit design life cycle, and periodically adjusted throughout the design lifecycle to reflect this. For example, at the beginning of the design life cycle, where both the logic and physical layout of the integrated circuit are still changing, a slack threshold value of −50 ps may be appropriate. Later, such as when the logic is stable while the physical layout is still changing, a slack threshold value of −30 ps may be appropriate. Finally, once both the logic and the physical layout are stable, a slack threshold value of −10 ps may be appropriate.

A user-defined range of signal arrival time values may be associated with any given pin, such as is well known in the art where such ranges are defined by designers in accordance with design rules or goals.

The latest-allowable signal arrival time at a pin is determined in accordance with conventional techniques, such as where a theoretical "zero wire length" minimum timing constraint is derived from logical design specification 104 without giving consideration to physical characteristics of the integrated circuit design.

Design automation apparatus 100 performs the actions indicated above for each boundary pin of each component of the integrated circuit and thereafter generates a revised physical design specification 102 of the integrated circuit that incorporates the current timing constraints 108, including the changes to timing constraints 108 described above.

Design automation apparatus 100 performs the above actions in multiple iterations corresponding to multiple physical designs 102 of the integrated circuit. While a candidate timing constraint corresponding to a given current timing constraint in any given iteration may be selected in any manner, in accordance with an embodiment of the invention the candidate timing constraint in a given iteration is a feedback constraint taken from the immediately preceding iteration, such as where the feedback constraint is the estimated signal arrival time corresponding to the given current timing constraint. This iterative process continues with new candidate timing constraints until all estimated signal arrival times for a given physical design of the integrated circuit meet their corresponding current timing constraints within specified tolerances, and/or until it is decided that physical, design of the integrated circuit is otherwise complete and ready to be used to manufacture the integrated circuit.

Any of the elements shown in FIG. 1 can be implemented by one or more computers in computer hardware and/or in computer software embodied in a non-transitory, computer-readable medium in accordance with conventional techniques.

Figure 2A:
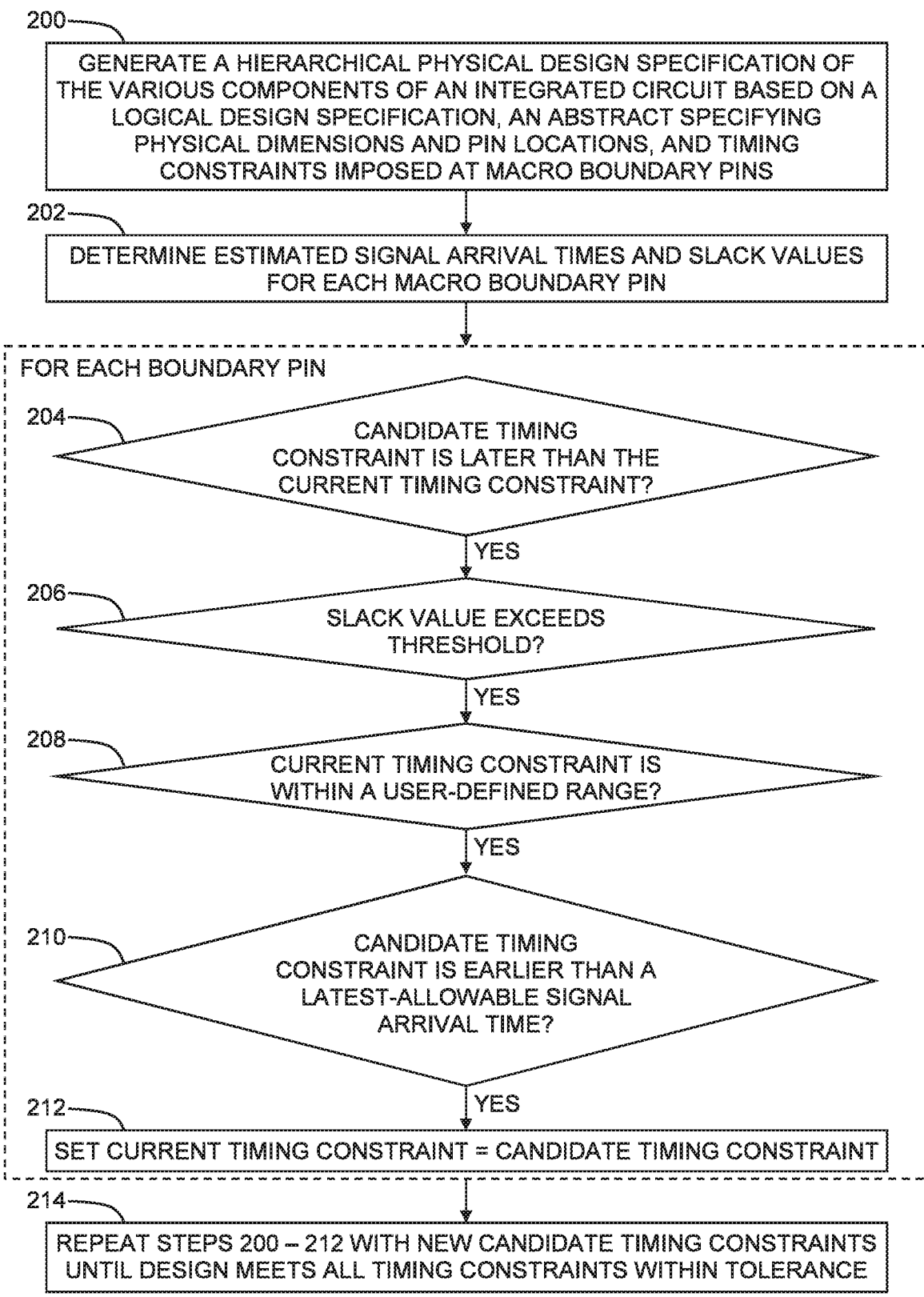
FIG. 2A and FIG. 2B, taken together, is a simplified flowchart illustration of an exemplary method of operation of the system of FIG. 1, operative in accordance with an embodiment of the invention.
Figure 2B:
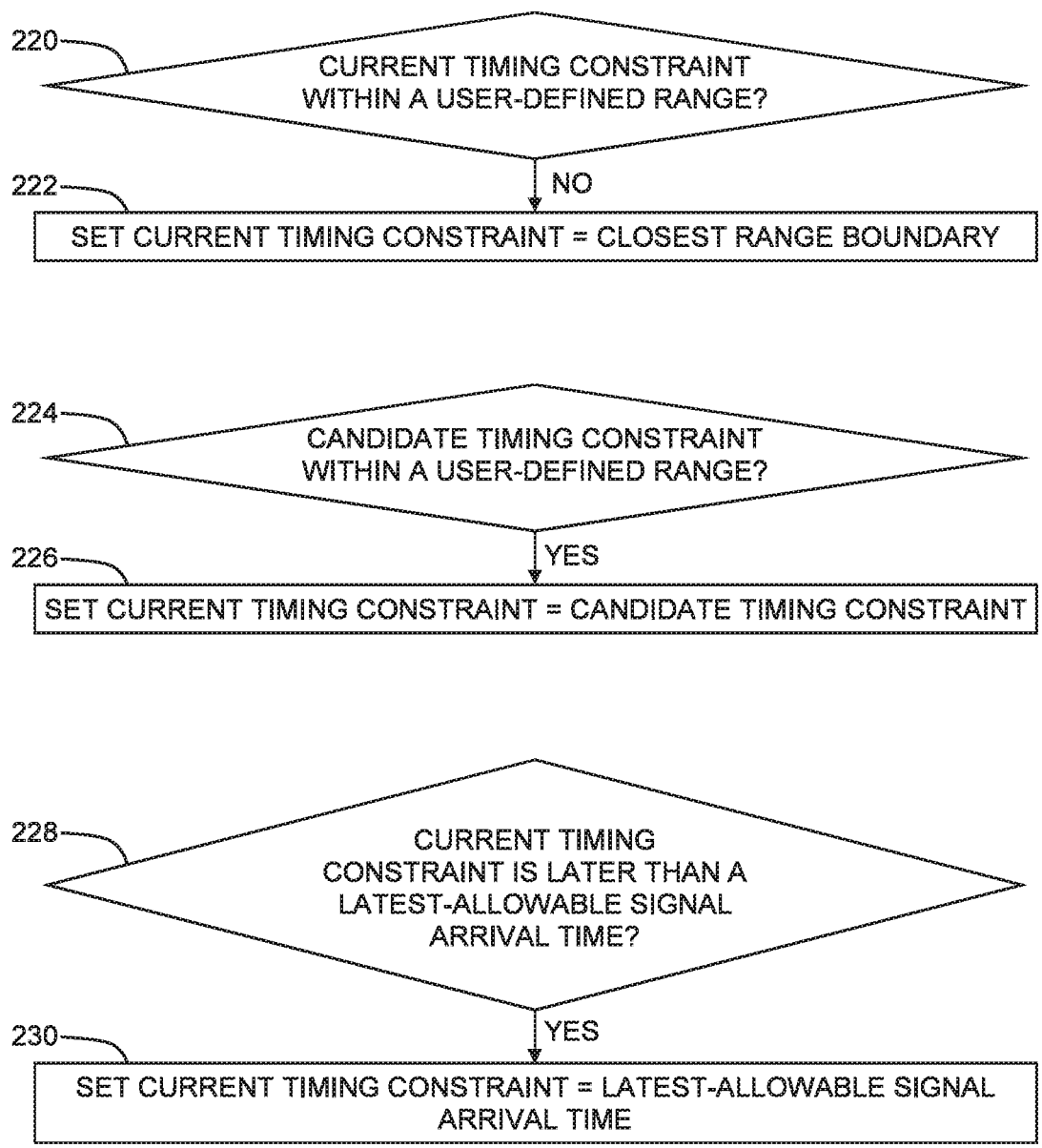

Reference is now made to FIG. 2A and FIG. 2B which, taken together, is a simplified flowchart illustration of an exemplary method of operation of the system of FIG. 1, operative in accordance with an embodiment of the invention. In FIG. 2A, a hierarchical physical design specification of the various components of an integrated circuit is generated based on a logical design specification of the integrated circuit, an abstract specifying the target physical dimensions and pin locations of the integrated circuit, and timing constraints imposed at the boundary pins of each macro component of the integrated circuit (step 200). Estimated signal arrival times and slack values are determined for each boundary pin of each macro component in the physical design specification of the integrated circuit (step 202). For each boundary pin, if a candidate timing constraint for the pin is later than the pin's current timing constraint (step 204), and a slack value associated with the current timing constraint has a greater negative value than a predefined negative slack threshold value (step 206), and the current timing constraint is within a user-defined range (if specified) of signal arrival time values associated with the pin (step 208), and the candidate timing constraint is earlier than a latest-allowable signal arrival time at the pin (step 210), then the current timing constraint for the pin is set equal to the candidate timing constraint (step 212). Steps 200-212 are repeated with new candidate timing constraints, such as the estimated signal arrival times from the preceding iteration, until all estimated signal arrival times for a given physical design of the integrated circuit meet their corresponding current timing constraints within specified tolerances, and/or until it is decided that physical design of the integrated circuit is otherwise complete and ready to be used to manufacture the integrated circuit (step 214).

In FIG. 2B, steps 220 and 222 are optionally implemented before step 212 of FIG. 2A, where if a pin's current timing constraint is not within a user-defined range of signal arrival time values associated with the pin, then the current timing constraint is set equal to the user-defined range boundary value that is closest to the current timing constraint. Steps 224 and 226 are optionally implemented before step 212 of FIG. 2A, where if a candidate timing constraint for the pin is within a user-defined range of signal arrival time values associated with the pin, then the current timing constraint for the pin is set equal to the candidate timing constraint. Steps 228 and 230 are optionally implemented before step 212 of FIG. 2A, where if the current timing constraint is later than the latest-allowable signal arrival time at the pin, then the given current timing constraint is set equal to the latest-allowable signal arrival time at the pin.

Figure 3:
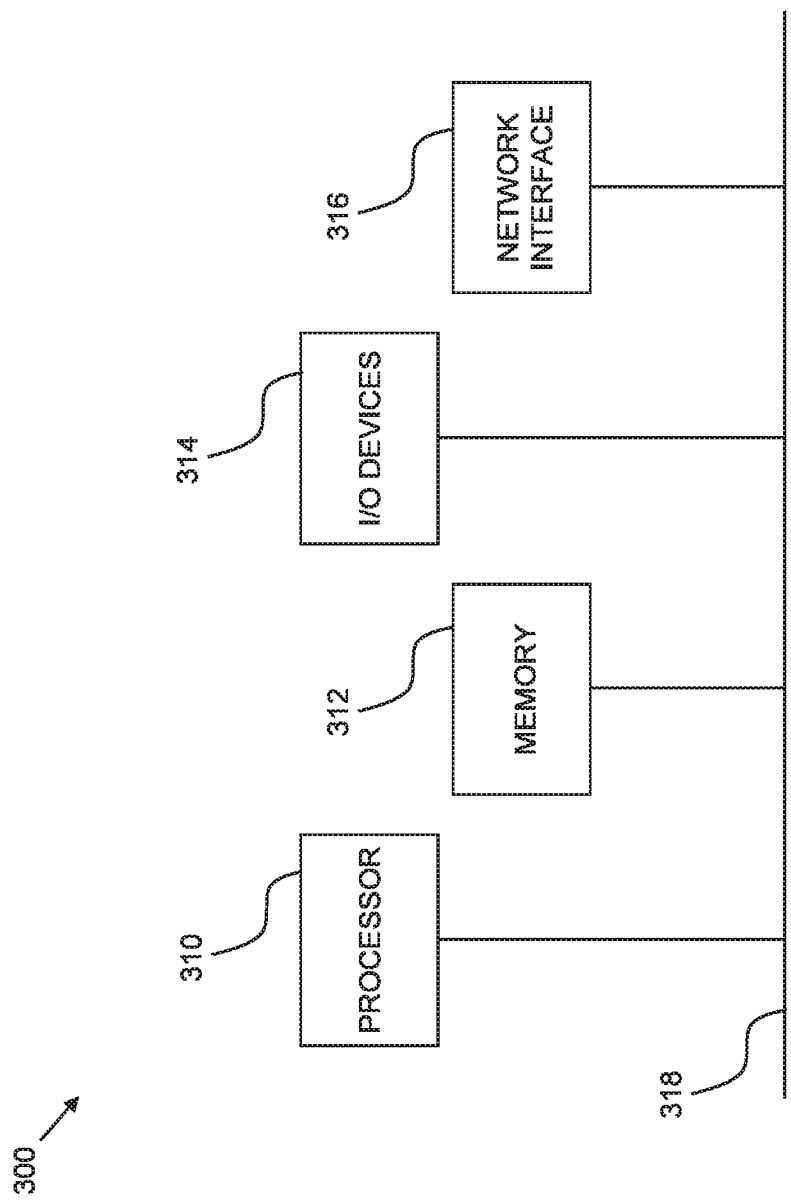
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2B) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a design of an integrated circuit, the method comprising:
   analyzing a physical design of an integrated circuit by evaluating a set of criteria comprising:
      determining, for a pin of a circuit of the integrated circuit, that a candidate timing constraint for signal arrival time at the pin is later than a current timing constraint for signal arrival time at the pin,
      determining that a slack value associated with the current timing constraint has a greater negative value than a predefined negative slack threshold value associated with the current timing constraint,
      determining that the current timing constraint is within a user-defined range of signal arrival time values associated with the pin, and
      determining that the candidate timing constraint is earlier than a latest-allowable signal arrival time at the pin;
   based upon determining that the physical design does not meet each of the set of criteria, setting the candidate timing constraint to a new candidate timing constraint and repeating the analyzing,
   based upon determining that the physical design meets each of the set of criteria:
      setting the current timing constraint equal to the candidate timing constraint; and
      generating a revised physical design of the integrated circuit that incorporates the current timing constraint.

2. The method according to claim 1 and further comprising performing multiple iterations of the analyzing, setting, and generating corresponding to multiple physical designs of the integrated circuit.

3. The method according to claim 2 wherein each of the iterations is performed after a timing analysis of the circuit is performed to determine an estimated signal arrival time at the pin and the slack value associated with the current timing constraint.

4. The method according to claim 3 wherein the iterations are performed until, for each pin of each circuit of the integrated circuit, the estimated signal arrival time at the pin meets the current timing constraint for signal arrival time at the pin within a specified tolerance.

5. The method according to claim 2 and further comprising determining the candidate timing constraint for a second of any two successive iterations of the multiple iterations by estimating a signal arrival time at the pin during a first of the two successive iterations.

6. The method according to claim 1 and further comprising performing the analyzing, setting, and generating for each of a plurality of circuits of the integrated circuit.

7. The method according to claim 6 and further comprising performing the analyzing, setting, and generating for each of a plurality of macros of the integrated circuit.

8. The method according to claim 1 and further comprising performing the analyzing, setting, and generating wherein the pin is an output pin of the circuit or an input pin of the circuit.

9. The method according to claim 1 and further comprising performing the analyzing, setting, and generating wherein the arrival time is of a signal rise or a signal fall.

10. A system for generating a design of an integrated circuit, the system comprising:
    design automation apparatus configured to
       analyze a physical design of an integrated circuit by evaluating a set of criteria comprising:
          determining, for a pin of a circuit of an integrated circuit, that a candidate timing constraint for signal arrival time at the pin is later than a current timing constraint for signal arrival time at the pin,
          determining that a slack value associated with the current timing constraint has a greater negative value than a predefined negative slack threshold value associated with the current timing constraint, determining that the current timing constraint is within a user-defined range of signal arrival time values associated with the pin, and determining that the candidate timing constraint is earlier than a latest-allowable signal arrival time at the pin, based upon determining that the physical design does not meet each of the set of criteria, set the candidate timing constraint to a new candidate timing constraint and repeat the analyzing, based upon determining that the physical design meets each of the set of criteria:

set the current timing constraint equal to the candidate timing constraint, and generate a revised physical design of the integrated circuit that incorporates the current timing constraint.

11. The system according to claim 10 wherein the design automation apparatus is configured to analyze the physical design, set the current timing constraint, and generates the revised physical design in multiple iterations corresponding to multiple physical designs of the integrated circuit.

12. The system according to claim 11 wherein each of the iterations is performed after a timing analysis of the circuit is performed to determine an estimated signal arrival time at the pin and the slack value associated with the current timing constraint.

13. The system according to claim 12 wherein the iterations are performed until, for each pin of each circuit of the integrated circuit, the estimated signal arrival time at the pin meets the current timing constraint for signal arrival time at the pin within a specified tolerance.

14. The system according to claim 11 wherein the design automation apparatus is configured to determine the candidate timing constraint for a second of any two successive iterations of the multiple iterations by estimating a signal arrival time at the pin doting a first of the two successive iterations.

15. The system according to claim 10 wherein the design automation apparatus is configured to analyze the physical design, set the current timing constraint, and generates the revised physical design for each of a plurality of circuits of the integrated circuit.

16. The system according to claim 15 wherein the design automation apparatus is configured to analyze the physical design, set the current timing constraint, and generates the revised physical design for each of a plurality of macros of the integrated circuit.

17. The system according to claim 10 wherein the pin is an output pin of the circuit or an input pin of the circuit.

18. The system according to claim 10 wherein the arrival time is of a signal rise or a signal fall.

19. A computer program product for generating a design of an integrated circuit, the computer program product comprising:

a non-transitory, computer-readable storage medium; and computer-readable program code embodied in the storage medium, wherein the computer-readable program code is configured to analyze a physical design of an integrated circuit by evaluating a set of criteria comprising:

determining, for a pin of a circuit of the integrated circuit, that a candidate timing constraint for signal arrival time at the pin is later than a current timing constraint for signal arrival time at the pin, determining that a slack value associated with the current timing constraint has a greater negative value than a predefined negative slack threshold value associated with the current timing constraint, determining that the current timing constraint is within a user-defined range of signal arrival time values associated with the pin, and determining that the candidate timing constraint is earlier than a latest-allowable signal arrival time at the pin;

based upon determining that the physical design does not meet each of the set of criteria, setting the candidate timing constraint to a new candidate timing constraint and repeating the analyzing, based upon determining that the physical design meets each of the set of criteria:

set the current timing constraint equal to the candidate timing constraint, and generate a revised physical design of the integrated circuit that incorporates the current timing constraint.

20. The computer program product according to claim 19 wherein the computer-readable program code is configured to analyze the physical design, set the current timing constraint, and generate the revised physical design in multiple iterations corresponding to multiple physical designs of the integrated circuit.

* * * * *